UNITED STATES PATENT OFFICE.

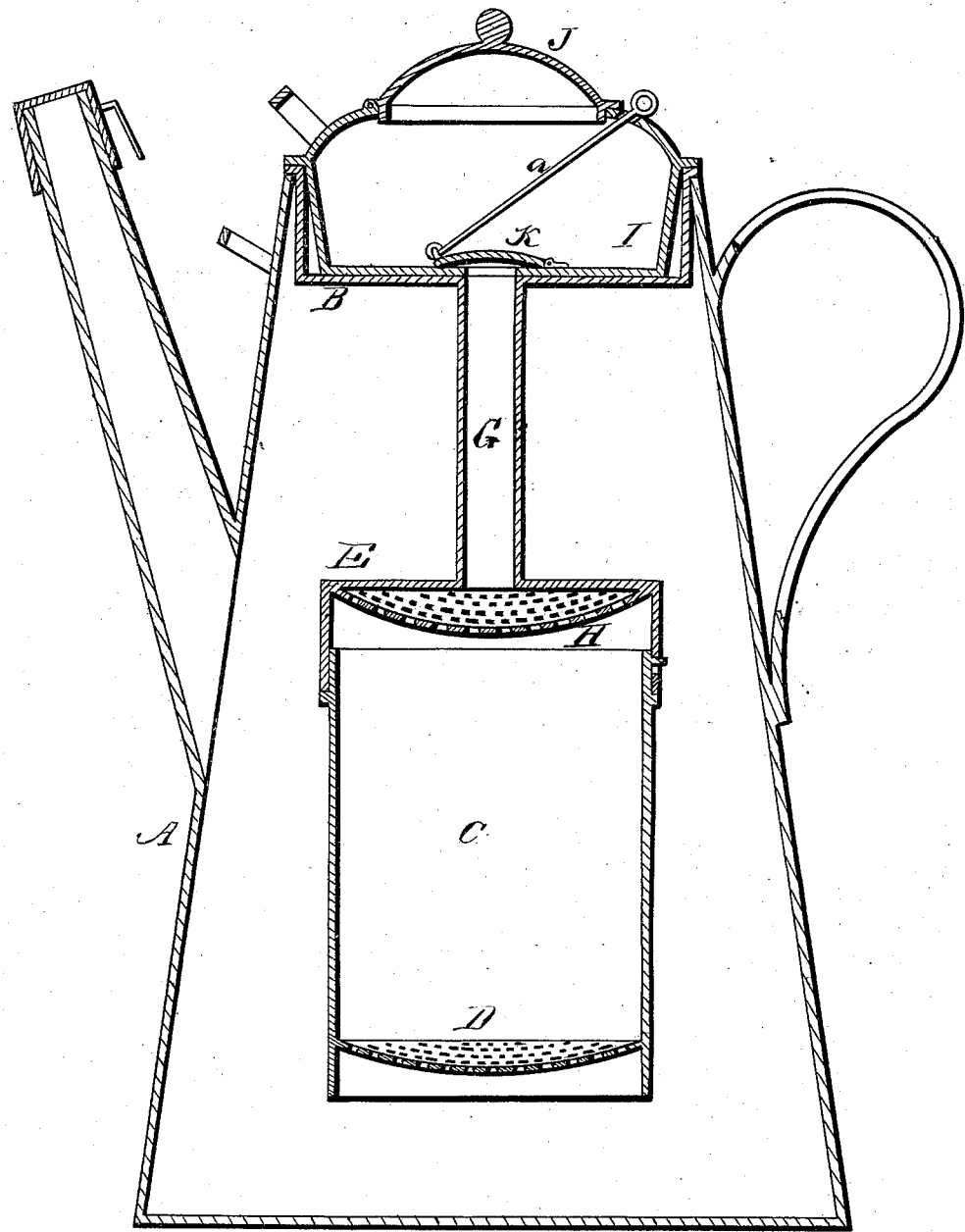

SOLOMON CROWELL, OF CORTLAND, NEW YORK.

IMPROVEMENT IN COFFEE-POTS.

Specification forming part of Letters Patent No. 169,626, dated November 2, 1875; application filed April 20, 1875.

*To all whom it may concern:*

Be it known that I, SOLOMON CROWELL, of Cortland, in the county of Cortland and State of New York, have invented a new and valuable Improvement in Coffee-Pots; and I do hereby declare that the following is a full, clear, and exact description of the construction and operation of the same, reference being had to the annexed drawings, making a part of this specification, and to the letters and figures of reference marked thereon.

The nature of my invention consists in the construction and arrangement of a coffee-pot, as will be hereinafter more fully set forth.

The annexed drawing is a longitudinal section of my coffee-pot, and fully illustrates my invention.

A represents a coffee-pot of any suitable form and size, and has a cup, B, inserted in and supported by its mouth. C represents an interior cup provided with a concave perforated bottom, D, upon which the ground coffee is placed. The cup C is closed by a cover, E, from which a tube, G, connects it with the bottom of the upper cup B, thus suspending the cup C therefrom. Within the cover E is secured a concave perforated diaphragm, H. Within the upper cup B is inserted another cup, I, having a hinged lid, J. In the bottom of the cup I is an aperture corresponding with the tube G, and said aperture is closed by a valve, K, provided with a rod, $a$, passing through the top of the cup I, so as to open the valve when desired.

The cup C that holds the coffee having no perforations, except through its bottom D, the water must pass entirely through the coffee before it gets into the main body of the pot. The perforated diaphragm H causes the water, as it passes through the pipe G to the cup C, to be equally distributed over the whole surface of the coffee at once.

The two cups B I form a double cover, thereby retaining the heat for a much longer time. By pouring cold water into this part, after the coffee-pot is filled, it will act as a condenser. Then, by raising the valve K' the water will pass into the coffee to replenish the same.

This device is very simple, and by its use all the strength of the coffee is extracted, and none of the aroma is lost.

Having thus fully described my invention, what I claim as new, and desire to secure by Letters Patent, is—

The combination of the cover B, hinged lid J, cup I, having valve K, the tube G, coffee-receptacle C E, with perforated bottom D, and the perforated diaphragm H, all constructed as described, and arranged within a coffee-pot, substantially as and for the purposes herein set forth.

In testimony whereof I have signed my name to this specification in the presence of two subscribing witnesses.

SOLOMON CROWELL.

Witnesses:
 CASSIUS M. CARR,
 L. L. CROWELL.